United States Patent Office 3,455,698
Patented July 15, 1969

3,455,698
DRIED MIX FOR CHEESECAKE FILLING
Demetrius G. Vakaleris, Niles, Ill., assignor to National Dairy Products Corporation, New York, N.Y., a corporation of Delaware
No Drawing. Filed Nov. 29, 1965, Ser. No. 510,394
Int. Cl. A21d
U.S. Cl. 99—94                                                       7 Claims

ABSTRACT OF THE DISCLOSURE

A dry food mix which is reconstitutable as a cheesecake filling comprising a major portion of an acid coagulable protein source, sugar, flour, cornstarch and an acidogen which is hydrolyzable in water to release an edible acid. The acidogen is selected so as to provide a pH in a batter of at least about 5.5 during the time period required for preparing the batter when the temperature of the batter is at least about 180° F. and at a level sufficient to effect coagulation of the protein source when fully hydrolyzed.

---

The present invention generally relates to dry food mixes, and more particularly relates to a dry food mix which is reconstitutable to provide a cheesecake filling.

Cheesecake is a dessert item which is conventionally prepared using a soft, uncured cheese, such as cream cheese, baker's cheese, or cottage cheese, as the base for a filling. The cheese is combined with other cake ingredients, such as flour, butter or vegetable shortening, eggs, sugar and vanilla or other flavorings, and is filled into a shell, such as a graham cracker shell. The filled shell is then baked to provide the final cheesecake product.

Inasmuch as the cheese which provides the base for the filling is a perishable food item, the householder normally must procure the cheese shortly before preparation of the cake. In an effort to permit the householder to prepare cheesecake at any time and without advance preparation, dry mixes have been manufactured and sold from which the householder can prepare a cheesecake filling. Such dry mixes, while eventually subject to deterioration, have substantially greater shelf life than cheese, and need not be kept in refrigerated storage. Such dry mixes have included a dry cheese product, usually dry baker's or cottage cheese, and are reconstituted with water or milk, with or without the addition of fat, to provide the cheesecake filling.

It is an object of the present invention to provide an improved dry food mix which, when reconstituted with liquid will provide a product utilizable as a cheesecake filling. Other objects and advantages of the present invention will become apparent from the following description and claims.

Generally, in accordance with the present invention, there is provided a dry food mix reconstitutable as a cheesecake filling which comprises milk protein and an edible acidogen. As used herein, the term "acidogen" denotes a compound which is capable of reacting with water (hydrolyzing) to produce an edible acid. Also as used herein, the term "milk protein" refers to a dry protein obtained by various milk processing or drying methods, and may be combined with the totality of fat, lactose, and protein obtained when a milk product, e.g., skim milk or whole milk, is dehydrated, or the protein may be a substantially pure milk protein, such as casein. The dry food mix of the present invention is stable at room temperatures for extended periods of time, and is readily reconstituted with water or fluid milk to provide a filling which, when baked, has desirable cheesecake flavor and texture.

More particularly, in accordance with the present invention, there is provided a dry mix comprising milk protein and an edible acidogen which, when the mix is reconstituted with water, to provide a batter will slowly hydrolyze at ambient temperatures and more rapidly hydrolyze at baking temperatures to produce an edible acid. A preselected level of acidogen is utilized which, when equilibrium hydrolysis is obtained, will provide sufficient acid to lower the pH of the batter to the iso-electric point of the protein of the milk solids, to thereby coagulate the protein. The acidogen may be used in combination with edible acids, such as citric, lactic, fumaric and the like. In this embodiment, the edible acid acts immediately with added fluids to partially lower the pH of the batter. The edible acid is provided at levels which will produce a batter pH of no less than about 5.5 with the acidogen providing the necessary acid to continue lowering the pH of the batter gradually to the iso-electric point of the protein at a cotnrolled rate upon subsequent hydrolysis of the acidogen. If the edible acid is at any higher level so as to effect a pH of the system lower than 5.5 at the time of reconstitution of the dry mix, protein destabilization occurs resulting in cakes with serious separation defects and grainy texture. The resultant protein coagulum closely resembles the coagulum obtained in conventional cheese-making operation, and provides a matrix through which the other components of the filling are distributed. Such other components are the conventional cake filling ingredients, such as flour, sugar, starch, flavorings, stabilizer, etc.

An edible acidogen which is particularly suited for the practice of the present invention is glucono-delta-lactone. During preparation of the batter, liquid (in the form of water or milk) is added to the dry mix at a temperature of 140° F. or above. At such temperature, the rate of hydrolysis of glucono-delta-lactone is such that only partial hydrolysis occurs as will be explained more fully hereinafter. Substantially complete hydrolysis of the glucono-delta-lactone is obtained when the batter is subjected to baking temperatures, i.e., from about 275° F. to about 350° F.

The glucono-delta-lactone is added to the dry mix at a level of from about 4.4 percent to about 6.7 percent based on the weight of the dry mix. This corresponds to a level of from about 20 percent to about 30 percent based on the weight of the protein. The level of glucono-delta-lactone used influences several of the physical properties of the batter and resultant baked cake. The pH of the batter and the pH of the resultant cake are proportional to the level of glucono-delta-lactone present, that is, the higher the level of glucono-delta-lactone, the lower the pH of the batter and the pH of the finished cake. This change in pH in turn influences the viscosity of the batter at a given level of water addition; the specific gravity of the batter; the firmness of the finished cake; and the flavor, body, and texture of the finished cake. Accordingly, the exact level of glucono-delta-lactone used in the practice of this invention is dependent on the weight to be afforded each of the related physical parameters and may be readily determined by one skilled in the art on the basis of the desired properties of the finished cake.

As noted above, the milk solids used in the practice of this invention may be skim milk powder, whole milk powder, casein, or mixtures thereof with other proteinaceous materials such as milk serum protein, soy protein, egg albumen, etc. When skim milk powder is used as the sole source of milk protein, substantially no fat is present in the dry mix, and such mixes are intended for making cakes wherein butter, margarine, or other source of fat is added at the time the dry mix is prepared for baking, or alternatively, for preparing low fat cakes.

Various commercially available powdered forms of fat, or whole milk powder, may be combined with skim milk powder to provide a dry mix which is suitable for preparing a cheesecake filling without further addition of a fat source at the time of preparation of the dry mix. A preferred source of dry fat is whole milk powder. The powdered dry fat is combined with the skim milk powder at a level sufficient to provide a finished cake containing from about 5 percent to 12 percent fat.

In this connection it is preferred to use skim milk powder and whole milk powder in the form that is obtained directly from a spray-dry process rather than the "instant" forms wherein the milk powders are agglomerated into larger particles following the spray-dry process. Finished cakes produced from dry mixes containing the non-agglomerated spray-dried milk powders are smoother and have a more uniform body texture than cakes produced from dry mixes containing the "instant" milk powders.

It is desirable to use as high a ratio of dry skim milk powder to flour and cornstarch as is consistent with an acceptable texture in the finished cake. The ratio of skim milk powder to flour to cornstarch may be from about 100:12:8 to about 100:2.5:2.5. The result of increasing the skim milk powder content in relation to that of the flour and cornstarch is equivalent to increasing the protein coagulum content of the finished cake by virtue of the protein glucono-delta-lactone reaction.

In the preparation of batter from the dry mix by addition of water, it has been found that the temperature of the water used in preparing the batter is functionally related to the properties of the finished cake. The temperature of the water determines the kinetics of the pH of the system through the rate of hydrolysis of the glucono-delta-lactone. This, in turn, is directly related to the coagulation of milk protein, the swelling and hydration of other protein components, and the solubilization of the starch, sugar and stabilizer present in the mix system. The temperature of the water not only affects important physical characteristics of the batter such as rheological properties, stability, and whipping properties, but more important, affects the overall quality of the finished cake. It has been determined that the properties of thickness, stability, and overrun of the batter improve substantially when the temperature of the added water exceeds 140° F. Below this temperature, the batters are thin, unstable, and show a poor air-cell structure. Optimum stability, thickness, smoothness, and desired volume are obtained in the preferred temperature range of about 160° F. to about 180° F. Water temperatures in excess of about 180° F. tend to cause rapid hydrolysis of the glucono-delta-lactone, resulting in rapid local milk protein coagulation and a lumpy, grainy characteristic in the batter and the finished cake.

The ratio of water added to the dry mix ingredients is from about 0.9:1 to about 1.1:1; a preferred ratio is about 1:1. At higher levels of water, the batter is undesirably thin and unstable and the finished cake does not have desirable body and uniformity, exhibiting separation defects. When the amount of water is less than that prescribed above, the cake tends to be dry and compact.

Various stabilizers may be used to stabilize the batter and for their contribution to the thickness, smoothness, and overrun of the batter. Stabilizers, however, are not essential for the formation of the protein coagulum of the reconstituted food product of this invention but are used primarily to aid in preparation of the food product through increasing the stability and handling properties of the batter. A preferred stabilizer is gelatin which may be used at a level of from about 1.5 percent to about 3.0 percent, preferably about 2.25 percent. Other stabilizers which may be used include carob bean gum, guar, carageenan and tapioca flour.

The following examples further illustrate various features of the present invention.

EXAMPLE I

Two variations of the dry food mix product of this invention were prepared. In Mix No. 1 the milk protein was supplied wholly from skim milk powder and consequently contains substantially no fat. In Mix No. 2, a source of fat is included in the mix.

Formulation for Mix No. 1.—No-fat

| Ingredients: | Weight percent |
|---|---|
| Skim milk powder | 62.1 |
| Flour | 3.4 |
| Cornstarch | 3.4 |
| Sugar | 22.6 |
| Salt (NaCl) | 0.8 |
| Gelatin | 2.3 |
| Glucono-delta-lactone | 5.4 |
| Lemon powder | 0.01 |

Formulation for Mix No. 2.—Fat source included

| Ingredients: | Weight percent |
|---|---|
| Skim milk powder | 18.3 |
| Whole milk powder (28% fat) | 48.9 |
| Flour | 2.9 |
| Cornstarch | 2.9 |
| Sugar | 19.6 |
| Salt (NaCl) | 0.8 |
| Gelatin | 2.0 |
| Glucono-delta-lactone | 4.6 |
| Lemon powder | 0.01 |

5 kiloframs of each of the two mixes were prepared by adding each of the dry ingredients consecutively in a Hobart blender. The blender was allowed to run for 20 minutes after the last of the ingredients was added so as to thoroughly mix all ingredients.

Each of the mixes was then packaged as individual cake-size proportions of 350 grams in moisture proof flexible containers. The containers were then placed in storage in controlled temperature rooms having temperatures of 72° F. and 98° F. At monthly intervals, for up to 6 months, the containers were removed and the contents were used to prepare the cakes of the following examples.

EXAMPLE II

Several baker's cheese-type cakes were prepared from the no-fat mix of Formulation No. 1 according to the following procedures. Cakes were prepared from dry mix ingredients that had been stored at both 72° F. and 98° F. The dry mix ingredients (350 grams) were removed from the flexible storage containers and placed in the bowl of a kitchen mixer. 350 grams (1.5 cups) of water were heated to a temperature of 175° F. and mixed with the dry mix ingredients by means of a rubber spatula to form a batter. One teaspoon of vanilla was added and the batter was beaten for 6 minutes, using speed 6 of the mixer. One egg yolk and ⅓ cup of softened margarine was then added to the batter and the beating was continued for an additional 2 minutes at speed 6. In a separate bowl, 3 egg whites with 3 tablespoons sugar added were beaten until stiff. The beaten egg whites were then folded into the batter using speed 1 of the mixer for 2 minutes. The batter filled two 6-inch cake pans which had a pre-baked graham cracker crust on the bottom. The batter was then baked at 300° F. for 30 minutes.

The resultant cheese cakes prepared from dry mixes which had been stored for up to 6 months were compared with cheesecakes which had been prepared with fresh baker's cheese in a conventional manner. There was substantially no difference in flavor or texture noted between the cheesecakes prepared from the dry cheesecake mix of this invention and the conventionally prepared cheesecakes. There was no detectable difference between cheesecakes prepared from dry mix ingredients which had been stored at 72° F. and those which had been stored at 98° F.

EXAMPLE III

A cream cheese-type cake was prepared according to the procedure of Example II except that 2 tablespoons of sugar were added to the dry mix ingredients and ⅔ cup softened margarine and 2 egg yolks were used. The resultant cream cheesecakes were comparable in texture and flavor to cream cheesecakes prepared in a conventional manner from fresh cream cheese.

EXAMPLE IV

A no-fat cheesecake was prepared according to the procedure of Example II with the exception that the margarine was excluded. The resultant cheesecakes, although less rich in flavor than the baker's cheesecakes or cream cheesecakes of Examples II and III, had an acceptable cheese flavor and a uniform desirable texture.

EXAMPLE V

An additional 100 lb. batch of dry mix No. 1 was prepared by adding each of the dry ingredients consecutively in a ribbon blender. The blender was allowed to run for 20 minutes after the last of the ingredients was added so as to thoroughly mix all ingredients. Baker's cheesecakes, cream cheesecakes and no-fat cheesecakes were prepared according to the procedures of Examples II, III and IV, wherein a dry mixture of 12 grams of dried egg white and 30 grams of sugar were substituted for the fresh egg white-sugar mixture of the examples. The dry egg white-sugar mixture was prepared by adding ½ cup of water to the dry mixture and blending until the dry egg whites and sugar were dissolved. The dissolved mixture was then beaten until stiff before folding into the cheesecake batter.

The resultant cakes were comparable in every respect to the cheesecake prepared with fresh egg whites.

EXAMPLE VI

Baker's cheesecakes were prepared from the dry mix of Formulation No. 2 wherein a source of fat is included with the dry mix. The procedure of Example II was followed using fresh egg whites with the exception that no margarine is added.

The resultant baker's cheesecakes were comparable in flavor and texture to the baker's cheesecakes of Example II and to the baker's cheesecakes that were prepared with fresh baker's cheese in a conventional manner.

A dairy type cheesecake dessert may be provided by incorporating various flavoring ingredients, such as chocolate, strawberry, banana, etc., into the dry mix formula.

The preceding examples clearly illustrate the effectiveness of the dry food mix product of this invention in preparing various types of cheesecake fillings. The dry mixes are shelf stable and may be stored for extended periods of time under ambient conditions without deterioration. The dry mixes provide the consumer with a choice as to the degree of fat that the finished cake will contain, and, thus, provides, if desired, a dietary dessert that is delicious and satisfying.

While the invention has been described in detail with specific examples, such examples are illustrative and are not given as limitations, since other modifications within the spirit and scope of the invention will be apparent to those skilled in the art.

What is claimed is:

1. A dry food mix which is reconstitutable as a cheesecake filling comprising a major portion of an acid coagulable protein source selected from the group consisting of skim milk powder, whole milk powder, casein, or mixtures of the same, sugar, flour, cornstarch and an acidogen which is hydrolyzable in water, to release an edible acid, said acidogen being selected so as to provide a pH in a batter prepared from the food mix of at least about 5.5 during the time period required for preparing the batter when the temperature of the batter is less than about 180° F. and said acidogen being present at a level sufficient to effect coagulation of said protein source when fully hydrolyzed.

2. The dry food mix of claim 1 in which the acidogen is glucono-delta-lactone.

3. The dry food mix of claim 2 in which the glucono-delta-lactone is present at a level of from about 20 percent to about 30 percent based on the weight of the protein.

4. A method for preparing a cheesecake type food product which comprises forming a mixture of a major portion of an acid coagulable protein source selected from the group consisting of skim milk powder, whole milk powder, casein or mixtures of the same, sugar, flour, cornstarch and an acidogen which is hydrolyzable in water by heating, adding a heated aqueous fluid to said mixture to form a batter and baking the batter at a temperature suitable to produce a cheesecake type food product containing coagulated protein, said acidogen being selected so as to provide a pH in said batter of more than about 5.5 when the temperature of said batter is less than about 180° F. during the time period required to prepare said batter, said acidogen being present at a level sufficient to effect said coagulation of said protein when fully hydrolyzed.

5. The method of claim 4 wherein the acidogen is glucono-delta-lactone.

6. The method of claim 4 in which the aqueous fluid has been heated to a temperature of from between about 140° F. and about 180° F.

7. The method of claim 6 in which the glucono-delta-lactone is present at a level of from about 20 percent to about 30 percent based on the weight of the protein.

References Cited

UNITED STATES PATENTS

| | | | |
|---|---|---|---|
| 2,939,792 | 6/1960 | Kline et al. | 99—94 |
| 3,170,795 | 2/1965 | Andre | 99—94 |
| 3,333,965 | 8/1967 | Kurtzhalts | 99—94 |

RAYMOND N. JONES, Primary Examiner

J. R. HOFFMAN, Assistant Examiner